US012778146B2

(12) United States Patent
Miller

(10) Patent No.: US 12,778,146 B2
(45) Date of Patent: Nov. 3, 2026

(54) METHOD OF AND SYSTEM FOR FORMING SAUSAGE LINKS FROM CONTINUOUS PRODUCT FEED

(71) Applicant: Risco USA Corporation, South Easton, MA (US)

(72) Inventor: Alan G. Miller, South Easton, MA (US)

(73) Assignee: RISCO USA CORPORATION, South Easton, MA (US)

( * ) Notice: Subject to any disclaimer, the term of this patent is extended or adjusted under 35 U.S.C. 154(b) by 0 days.

(21) Appl. No.: 19/173,157

(22) Filed: Apr. 8, 2025

(65) Prior Publication Data

US 2025/0311738 A1 Oct. 9, 2025

Related U.S. Application Data

(60) Provisional application No. 63/631,330, filed on Apr. 8, 2024.

(51) Int. Cl.
*A22C 11/10* (2006.01)
*A22C 11/00* (2006.01)

(52) U.S. Cl.
CPC .......... *A22C 11/104* (2013.01); *A22C 11/008* (2013.01); *A22C 11/107* (2013.01)

(58) Field of Classification Search
CPC ... A22C 11/008; A22C 11/104; A22C 11/105; A22C 11/107; A22C 11/108
USPC .............................................. 452/46, 48, 51
See application file for complete search history.

(56) References Cited

U.S. PATENT DOCUMENTS 2,663,982 A 12/1953 Conti
3,328,835 A 7/1967 Gartrell
3,971,101 A 7/1976 Townsend et al.
4,073,039 A * 2/1978 Muller .................. A22C 11/02 452/49
4,104,763 A * 8/1978 Tetsuro ................ A22C 11/006 452/49
4,320,558 A * 3/1982 Martinek ............... A22C 13/02 452/26
4,418,447 A 12/1983 Ziolko
4,614,005 A * 9/1986 Townsend ............ A22C 11/107 198/805
5,049,108 A 9/1991 Staudenrausch
5,833,525 A 11/1998 Hanlon et al.

(Continued)

OTHER PUBLICATIONS

International Search Report and Written Opinion issued by U.S. Patent Office as International Searching Authority in International Application No. PCT/US25/23589, dated Jun. 16, 2025 (14 pages).

*Primary Examiner* — David J Parsley
(74) *Attorney, Agent, or Firm* — Wilmer Cutler Pickering Hale and Dorr LLP

(57) ABSTRACT

The present disclosure provides a mechanical system for portioning a sausage string by forming links while continuously feeding the sausage string through the portioning apparatus. The portioning apparatus includes pincers that rotate and interleave for a portion of the rotation and apply pressure while interleaved to the sausage string thereby forming a link. The pincers face substantially towards each other while rotating. The pincers are configured to be at an angle when they are in an open position compared to when they are in a closed position.

20 Claims, 22 Drawing Sheets

(56) References Cited

U.S. PATENT DOCUMENTS

| | | | | |
|---|---|---|---|---|
| 6,468,144 | B1 * | 10/2002 | Michaud | A22C 11/108 452/46 |
| 7,479,058 | B2 | 1/2009 | Baechtle et al. | |
| 7,862,407 | B2 | 1/2011 | Panizzon | |
| 9,044,031 | B2 | 6/2015 | Baechtle | |
| 11,779,026 | B2 * | 10/2023 | Schliesser | A22C 11/107 452/46 |
| 2010/0184364 | A1 | 7/2010 | Le Pabic | |
| 2014/0170946 | A1 | 6/2014 | Baechtle | |
| 2015/0099441 | A1 | 4/2015 | Le Paih et al. | |
| 2022/0192208 | A1 | 6/2022 | Schliesser et al. | |

* cited by examiner

METHOD OF AND SYSTEM FOR FORMING SAUSAGE LINKS FROM CONTINUOUS PRODUCT FEED

RELATED APPLICATIONS

This application claims the benefit of U.S. Provisional Application No. 63/631,330, filed Apr. 8, 2024, the entire contents of which are hereby incorporated by reference in their entirety.

FIELD OF THE INVENTION

The present invention relates generally to the field of food processing, and more particularly to a method of and system for high-speed portioning of sausage strings by forming links in a mass production environment.

BACKGROUND OF THE INVENTION

The sausage-making process involves filling a casing with meat stuffing, thereby forming a long sausage string. The sausage string is then portioned by forming links at the desired points of the sausage string. In mass production, portioning process is critical, as it involves the rapid division of the continuous sausage string into uniform portions. This step ensures consistent sizing and streamlines packaging. Typically, the process entails high-speed feeding of the sausage string, applying pressure with pincers at the desired points along the string, and twisting the string to form links.

Existing devices for forming sausage links in mass production have problems. One problem involves scratching of the sausage casing, typically made from natural intestine, by the pincers. This scratching can cause ruptures during the portioning process. A typical solution is to limit the pincer movement perpendicular to the sausage string. However, known solutions often involve numerous moving parts, including many motors, as described in U.S. Pat. No. 9,044,031. Having more moving parts increases the risk of system failures, requires additional maintenance, drives up costs, and also requires more space.

Another problem is that existing devices require retooling to process various sizes of sausages. To process sausages with different lengths and thicknesses without interrupting mass production process, the device must be easily adjustable. If the device requires retooling for each size change, that interrupts the production line and decreases production capacity. A device described in U.S. Pat. No. 7,862,407 allows portioning sausages at different length, but this device is very bulky with many moving parts.

SUMMARY

The system disclosed herein provide an apparatus comprising a first beam coupled to a base and a second beam coupled to the base. The apparatus further comprises a first pincer gear coupled to the first beam and configured to rotate the first beam and a second pincer gear coupled to the second beam and configured to rotate the second beam, where the first pincer gear is configured to rotate the second pincer gear and a driver gear is configured to rotate the first pincer gear. The apparatus further comprises a first pincer coupled to the first beam and defining a first pinching edge and a second pincer coupled to the second beam and defining a second pinching edge. The first beam and the first pincer are configured to rotate around a first axis of the first pincer gear, and the second beam and the second pincer are configured to rotate around a second axis of the second pincer gear synchronously with the first beam and the first pincer. The first pincer and the second pincer are configured to interleave to apply pressure between the first pinching edge and the second pinching edge to form a portioning link, and the first pinching edge of the first pincer and the second pinching edge of the second pincer are configured to face substantially towards each other as the first pincer and the second pincer rotate. The axis along a length of the first beam when the first pincer is farthest from the second pincer is at an angle relative to the axis along the length of the first beam when the first pincer is closest to the second pincer. The beams can be coupled to the base at an angle, thereby resulting in a conical motion when rotating. The beams can also be coupled to the base using a non-rotational joint, thereby are not configured to rotate about the axis through the length of the beams while rotating with the pincer gears. This allows pincers to remain substantially parallel to each other and to face substantially towards each other as the pincers rotate. In some embodiments, the apparatus can further comprise a takeaway belt configured to carry a sausage string, where the driver gear is configured to rotate in sync with the rotation of the takeaway belt such that the sausage string can travel along the takeaway belt while the first pincer gear and the second pincer gear rotate and the first pincer and the second pincer continuously apply pressure between the first pinching edge and the second pinching edge to from the portioning link as the first pincer and the second pincer travel with the sausage string for a predefined distance.

In some embodiments, the angle of the axis along the length of the first beam when the first pincer is farthest from the second pincer relative to the axis along the length of the first beam when the first pincer is closest to the second pincer can be at least 2 degrees. In other embodiments, the angle can be at least 4 degrees. In other embodiments, the angle can be configurable.

In some embodiments, the pinching side of the pincers can be substantially V-shaped. In other embodiments, the pinching side of the pincers can be substantially semi-circle shaped. In other embodiments, the pinching side of the pincers can include a groove. In some embodiments, the beams can be coupled to the base through a ball-and-socket joint. In some embodiments, at least one idler gear can be coupled between the driver gear and the first pincer gear. In some embodiments, a housing can enclose some components of the apparatus including the driver gear, the first pincer gear, and the second pincer gear. In some embodiments, the dimension of the housing can be about 160 millimeter by 160 millimeter by 100 millimeter or smaller. In some embodiments, a rotating seal can conceal a gap between the first beam and the housing.

In some embodiments, the rotational speed of the driver gear can be configurable. Also, in some embodiments, the driver gear can be configured to pause between one rotation of the first beam and the first pincer. In some embodiments, the pause between rotation of the first beam and the first pincer can be configurable.

DESCRIPTION OF THE INVENTION

Preferred embodiments of the invention provide a portioning device that is compact, easy to maintain, reduces costs, and is capable of forming sausage portions of various sizes without rupturing. The device is amenable to high-speed, mass production environment.

Figure 1A:
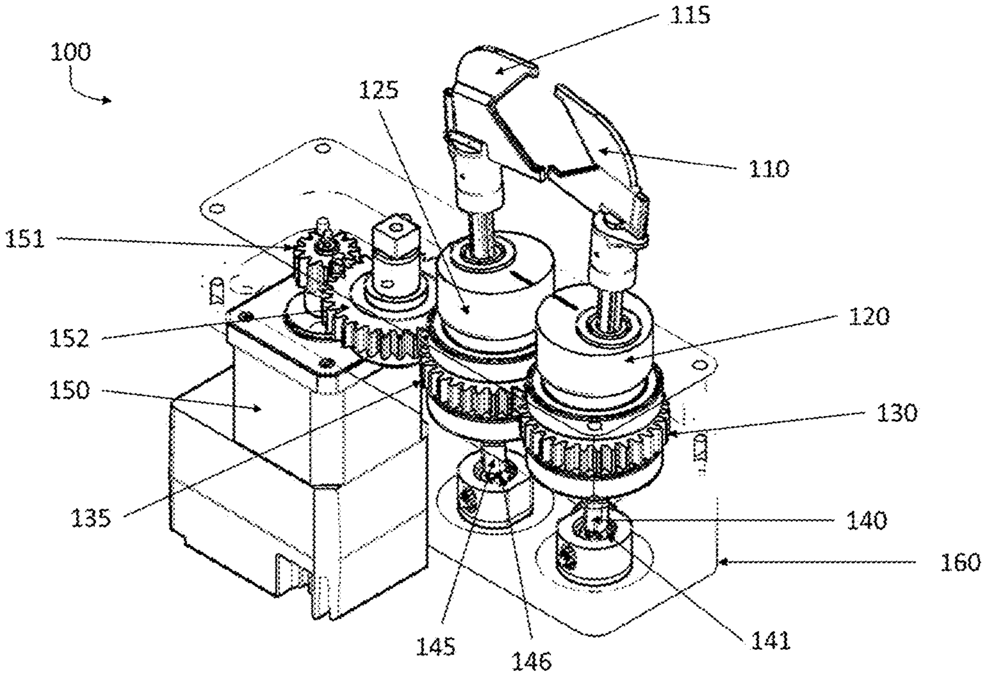
FIG. 1A is a perspective view of an embodiment of the invention showing two pincers in an open position, farthest from each other.

FIG. 1A shows an embodiment of a mechanical system designed for high-speed portioning of a sausage string by forming links in mass production environment. A portioning device 100 includes pincers 110 and 115, rotator plates 120 and 125, gears 130, 135, 151, and 152, beams 140 and 145, a motor 150, and a housing 160. The housing 160 is transparently illustrated in FIGS. 1A-1F to show the components inside the housing. FIG. 1A depicts a portioning device in an open position with the two pincers 110 and 115 farthest from each other. A sausage string (not shown) is fed between the two pincers 110 and 115.

Figure 1B:
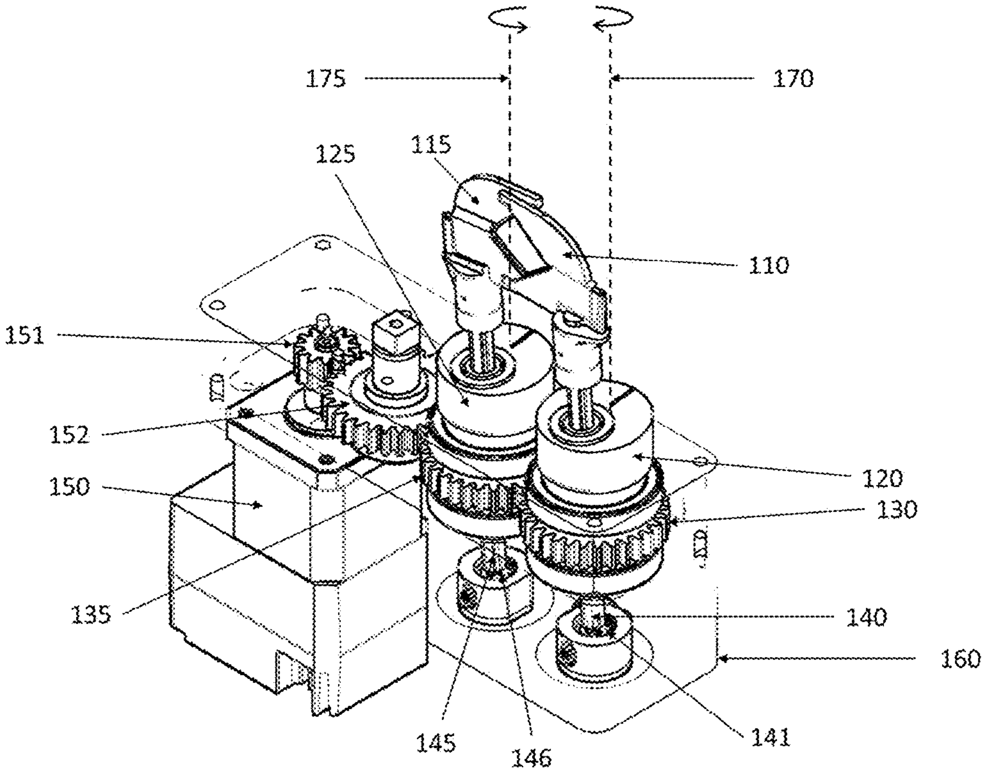
FIG. 1B is a perspective view of an embodiment of the invention showing two pincers in an intermediate position, in which the rotator plates are rotated approximately 90 degrees from the open position.
Figure 1C:
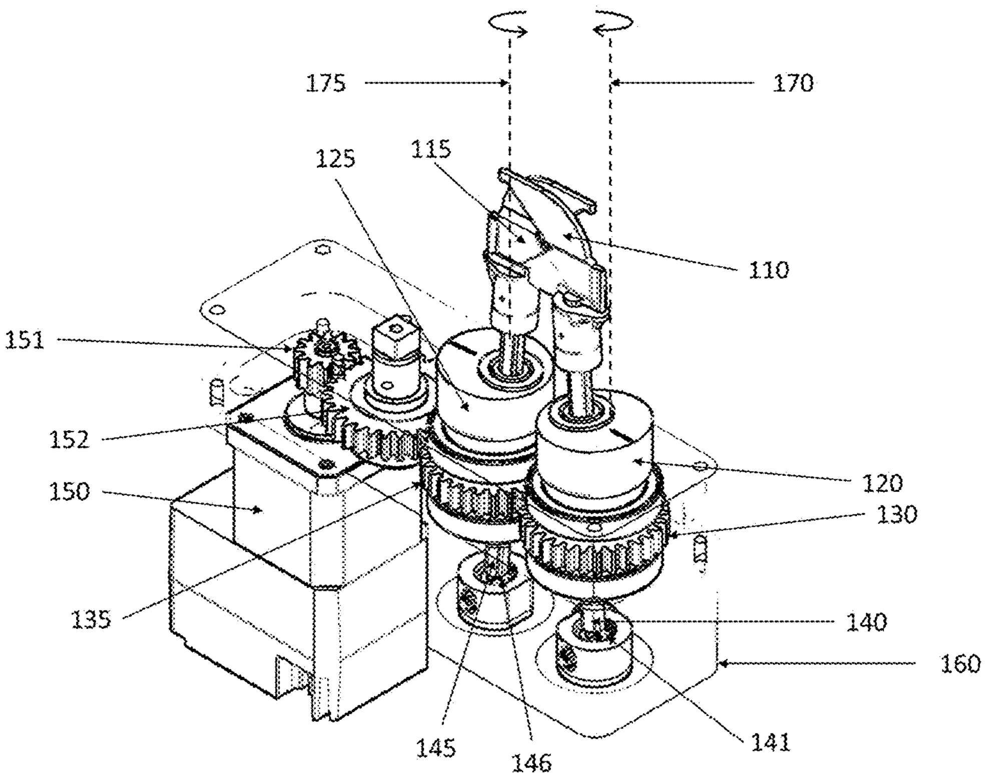
FIG. 1C is a perspective view of an embodiment of the invention showing two pincers interleaved in a closed position, in which the rotator plates are rotated approximately 180 degrees from the open position.
Figure 1D:
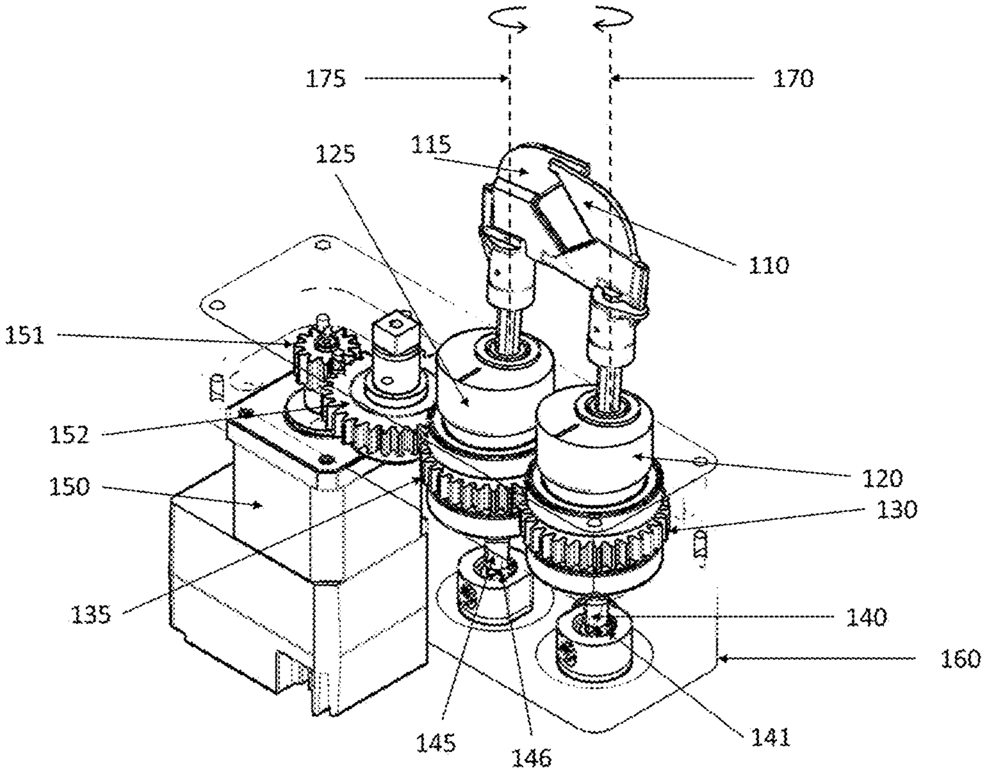
FIG. 1D is a perspective view of an embodiment of the invention showing two pincers in an intermediate position, in which the rotator plates are rotated approximately 270 degrees from the open position.

FIGS. 1B, 1C, and 1D depict a portioning device with pincers 110 and 115 at different positions, with the rotator plate 120 rotated clockwise and the rotator plate 125 rotated counter-clockwise, respectively. FIG. 1B depicts the rotator plate 120 rotated approximately 90 degrees clockwise about the axis 170, and the rotator plate 125 rotated approximately 90 degrees counter-clockwise about the axis 175, from the open position shown in FIG. 1A. FIG. 1C depicts the rotator plate 120 rotated approximately 180 degrees clockwise about the axis 170, and the rotator plate 125 rotated approximately 180 degrees counter-clockwise about the axis 175, from the open position shown in FIG. 1A. In FIG. 1C, where the two pincers 110 and 115 are interleaved in a closed position, the pincers apply pressure between the pinching edge of the pincers to the sausage string (FIGS. 3A-3G). The inward motion of the two pincers applies pressure between the pinching edge of the pincers to the sausage string, and a link is formed when the sausage string is twisted, at or right after the pincers 110 and 115 are released from the closed position. The twisting of the sausage string is typically performed by known equipment that feeds the sausage string to the portioning device 100 and is not shown in the figures of this application. FIG. 1D depicts the rotator plate 120 rotated approximately 270 degrees clockwise about the axis 170, and the rotator plate 125 rotated approximately 270 degrees counter-clockwise about the axis 175, from the open position shown in FIG. 1A.

In some embodiments, the pinching side of the pincers 110 and 115 include a substantially V-shaped panel, facing each other, thereby creating a substantially diamond-shaped opening. The sausage string is fed through this opening. In other embodiments, the panels can take on different shapes, for example, a semi-circle, as long as the two pincers 110 and 115 can be brought inward and apply enough pressure to the sausage string. Additionally, the panels may include additional recess or groove at the center of the panel (e.g., at the valley of the V) to apply even more pressure to the sausage string.

In some embodiments, the pincer 110, rotator plate 120, and pincer gear 130 are mounted to the beam 140, and the beam 140 is coupled to the bottom of the housing 160 through one or more bearings 141 that allow circular movement. For example, a ball-and-socket joint can be used for coupling the beam 140 to the base of the housing 160. When the pincer gear 130 rotates clockwise about the axis 170, for example, the beam 140 also turns clockwise in tandem with the pincer gear 130, and the pincer 110 and the rotator plate 120 also turn clockwise together with the beam 140. The rotation of the gear 130 can be seen from the position mark on the rotator plate 120 from each of FIGS. 1A-1D. Likewise, the pincer 115, rotator plate 125, and pincer gear 135 are mounted to the beam 145, and the beam 145 is coupled to the bottom of the housing 160. When the gear 135 rotates counter-clockwise about the axis 175, for example, the beam 145 also turns counter-clockwise in tandem with the pincer gear 135, and the pincer 115 and the rotator plate 125 also turn counter-clockwise together with the beam 145. The rotation of the pincer gear 135 also can be seen from the position mark on the rotator plate 125 from each of FIGS. 1A-1D. The beams can be coupled to the base at an angle, thereby resulting in a conical motion when rotating. The beams can also be coupled to the base using a non-rotational joint, thereby are not configured to rotate about the axis through the length of the beams while rotating about the axis 170 or 175. This allows pincers 110 and 115 remain parallel to each other and to face substantially towards each other as the pincers rotate.

In some embodiments, the rotation of the pincer gears 130 and 135 is controlled by the motor 150. The motor 150 is linked to a driver gear 151, which, in turn, is linked to an idler gear 152. The idler gear 152 is coupled with the pincer gear 135, which is coupled with another pincer gear 130. If necessary, more than one idler gear can be used. When the motor turns the driver gear 151 counter-clockwise, the driver gear 151 turns the idler gear 152 clockwise, subsequently rotating the pincer gear 135 counter-clockwise. The pincer gear 135 then turns the pincer gear 130 clockwise. This streamlined design with a single control element achieves simplicity in both design and operation. Using the same-sized gears for the pincer gears 130 and 135 enables synchronous movement of the pincers 110 and 115. Using interconnected gears minimizes points of error and facilitates a compact design. This configuration also lowers maintenance costs since each of the pincers needs only one gear.

All four gears 130, 135, 151, and 152 can be housed in a compact enclosure, a housing 160. Enclosing the gears 130, 135, 151, and 152 inside the housing 160 prevents sausage residues from falling onto the moving parts, interfering with the operation, and potentially damaging the device. Also, the housing 160 prevents liquids (e.g., cleaning solutions, sausage residues) from damaging the components inside. For example, the housing allows the components outside the housing to be easily washed while protecting the internal components. In some embodiments, a rotating seal conceals the gap between the rotator plate and the housing, further preventing liquids from entering the housing while allowing the rotator plate to rotate. Similarly, in some embodiments, another rotating seal conceals the gap between the rotator plate and the beam that protrudes from the rotator plate and connects to the pincer. This way, gears and bearings inside the housing are protected from rusting and can last longer, thereby reducing production costs and increasing overall efficiency.

In some embodiments, since the rotation of the pincers 110 and 115 can be synchronized, the V-shaped panels of the pincers 110 and 115 can face substantially the same direction—towards each other—at all times throughout their rotation. The beams can be coupled to the base at an angle, thereby resulting in a conical motion when rotating. The beams can also be coupled to the base using a non-rotational joint, thereby are not configured to rotate about the axis through the length of the beams while rotating with the pincer gears. This allows pincers to remain substantially parallel to each other and to face substantially towards each other as the pincers rotate. This configuration enables the pincers to close in a direction substantially perpendicular to the travel path of the sausage string, thus reducing the distance the panels travel along with the sausage string, and reducing the risk of rupturing by scratching the sausage casing.

In some embodiments, the pincers 110 and 115 may be mounted substantially perpendicular to their support structures 140 and 145. In this embodiment, the pincers 110 and 115 open and close along a line that is substantially parallel to the base of the housing 160 and substantially perpendicular to the travel path of the sausage string.

Figure 1E:
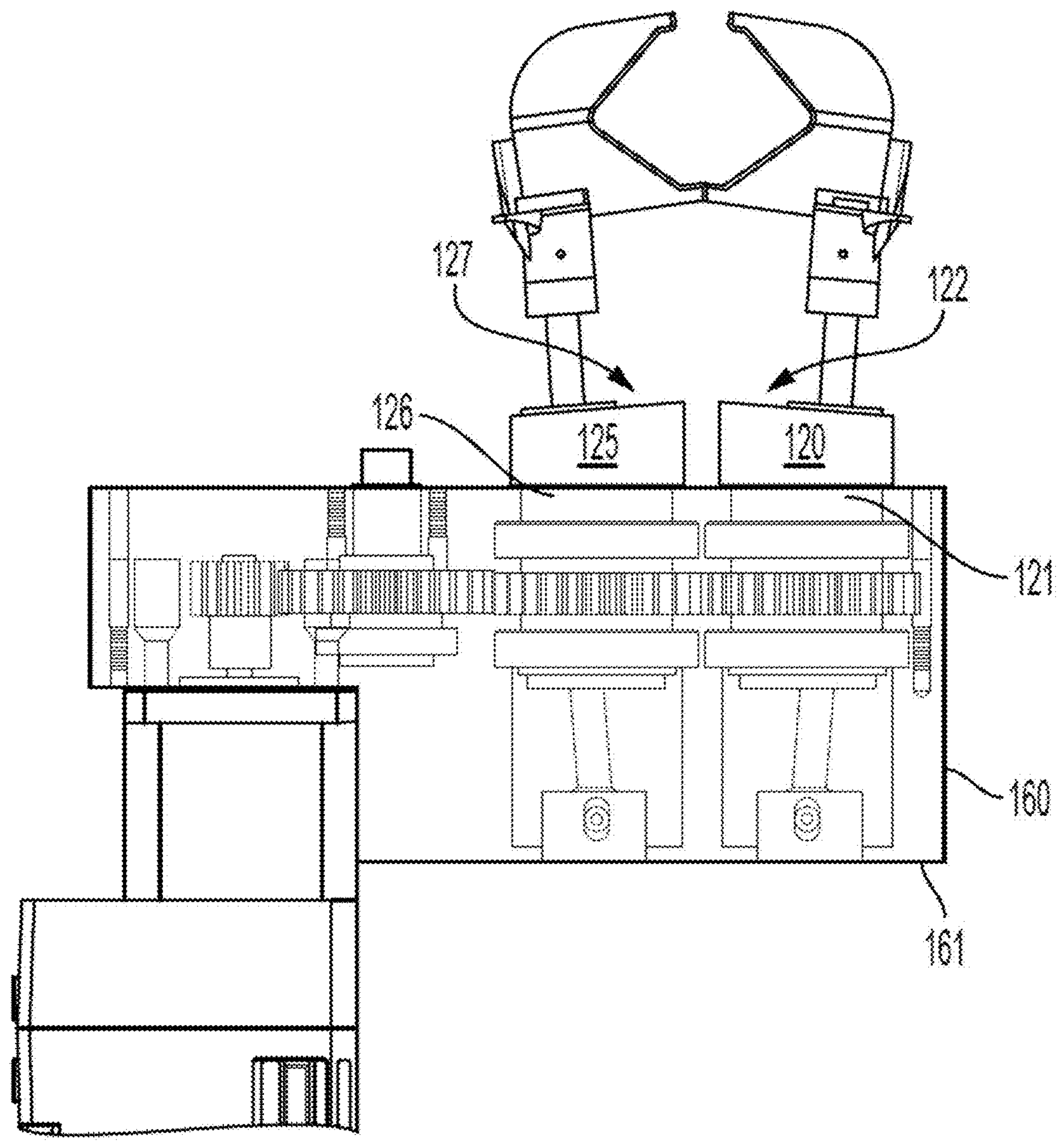
FIG. 1E is a front view of an embodiment of the invention showing two pincers in an open position, farthest from each other.
Figure 1F:
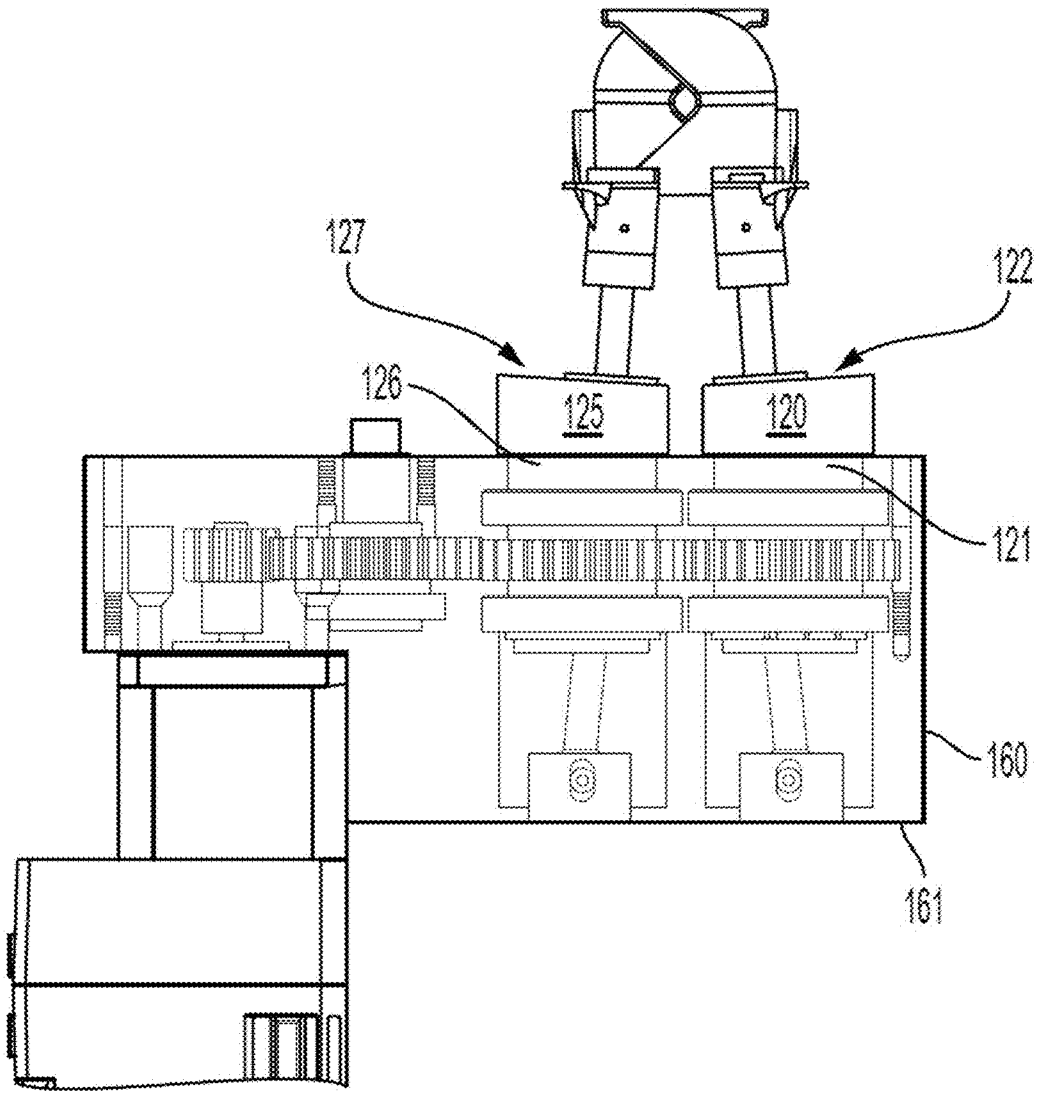
FIG. 1F is a front view of an embodiment of the invention showing two pincers interleaved in a closed position, in which the rotator plates are rotated 180 degrees from the open position.
Figure 1G:
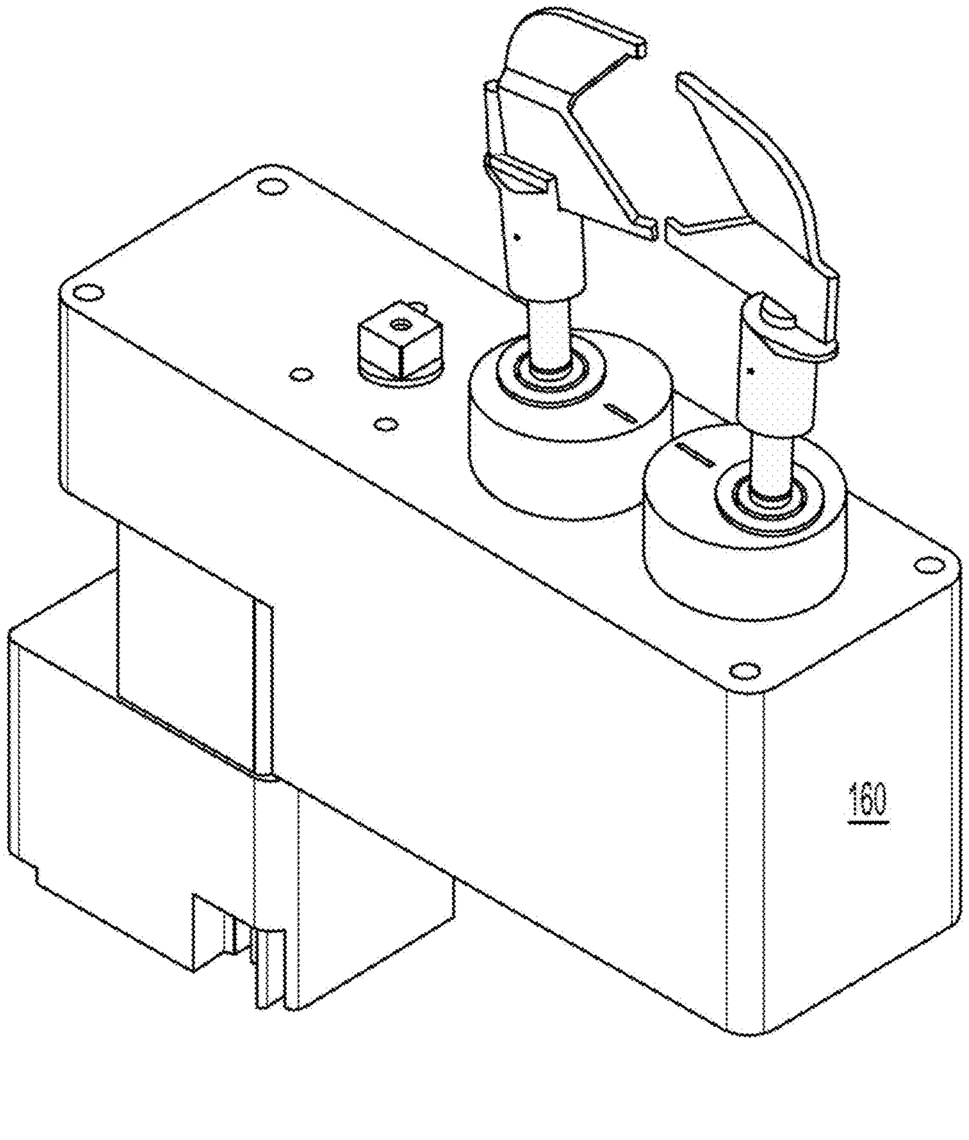
FIG. 1G is a perspective view of an embodiment of the invention, partly enclosed in a housing, showing two pincers in an open position.

In some embodiments, the pincers 110 and 115 may be mounted to their support structures 140 and 145 at a slight angle, for example, less than approximately 10 degrees off from the perpendicular direction. This configuration allows the pincers to squeeze in slightly at an angled direction during the portioning process. The support structures 140 and 145 may be mounted to the base of the housing 160 at a slight angle, for example, less than approximately 10 degrees off from the perpendicular direction. This allows the pincers 110 and 115 to be aligned at an outward angle when the two pincers are in the open position. FIG. 1E provides a front view of this embodiment showing the two pincers opened at an angle, and FIG. 1F provides a front view of this embodiment showing the two pincers interleaved in the closed position. When the pincers are interleaved in the closed position (FIG. 1F), the pincers align substantially parallel to the base 161 of the housing 160 and substantially perpendicular to the travel path of the sausage string. FIGS. 1E and 1F also depict a more detailed view of the rotator plates 120 and 125. The rotator plate 120, for example, has a flat bottom surface 121, substantially parallel to the base 161 of the housing 160. The top surface 122 of the rotator plate 120 has a flat surface slightly slanted from the bottom surface 121 so that the pincer can be aligned at an angle when in an open position.

FIGS. 2A-2E show another embodiment of a portioning device. In this embodiment, a motor 250 is linked to a driver gear 251, and the driver gear 251 is coupled with a pincer gear 230, and the pincer gear 230 is coupled with another pincer gear 235. When the motor 250 turns the driver gear 251 counter-clockwise, the driver gear 251, in turn, rotates the pincer gear 230 clockwise, subsequently rotating the pincer gear 235 counter-clockwise. This is another example of a streamlined design that achieves simplicity with a single control element. Using the same-sized gears for the pincer gears 230 and 235 enables synchronous movement of the pincers 210 and 215. Using interconnected gears minimizes points of error and facilitates a compact design. This configuration also lowers maintenance costs since each of the pincers needs only one gear.

Figure 2A:
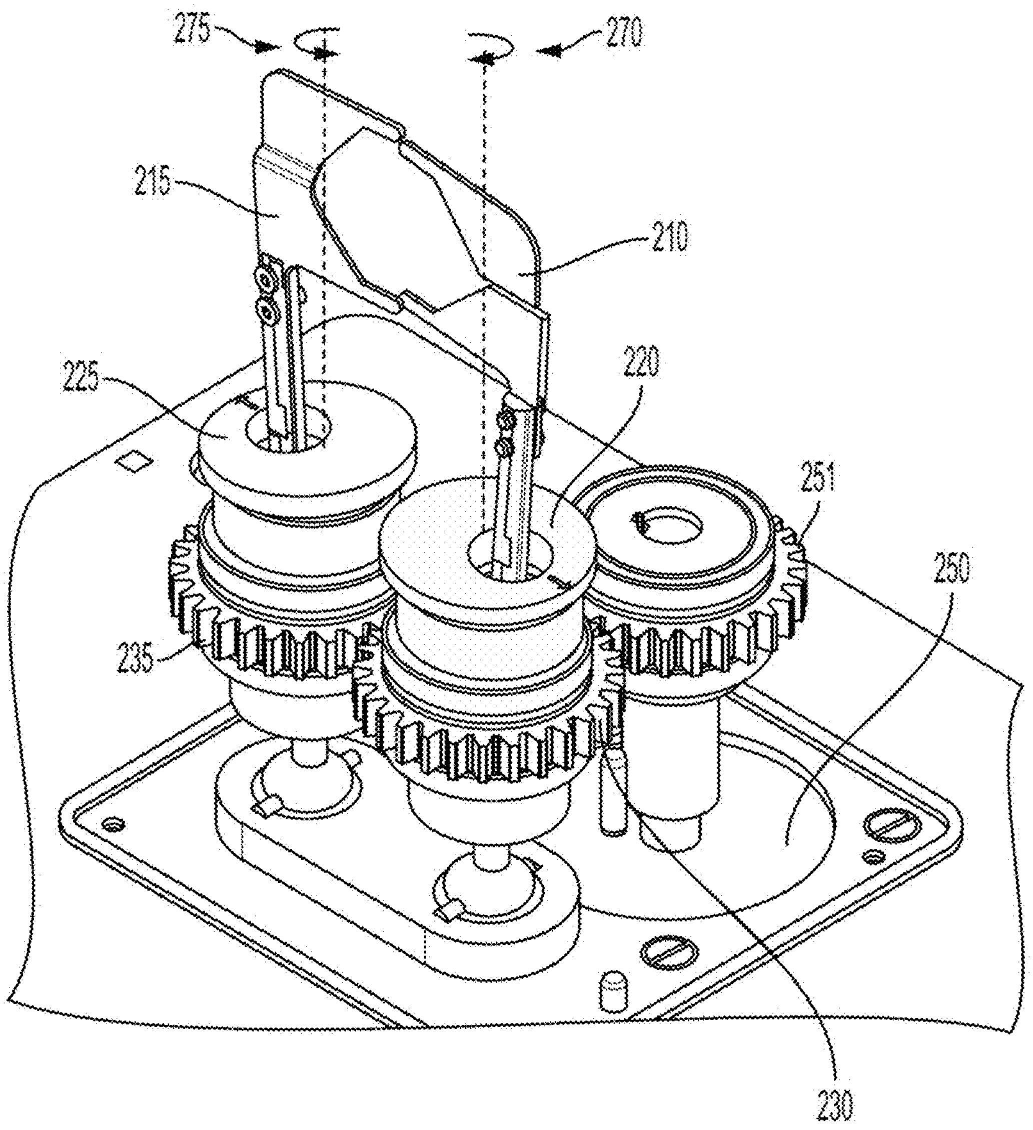
FIG. 2A is a perspective view of an embodiment of the invention showing two pincers in an open position, farthest from each other.
Figure 2B:
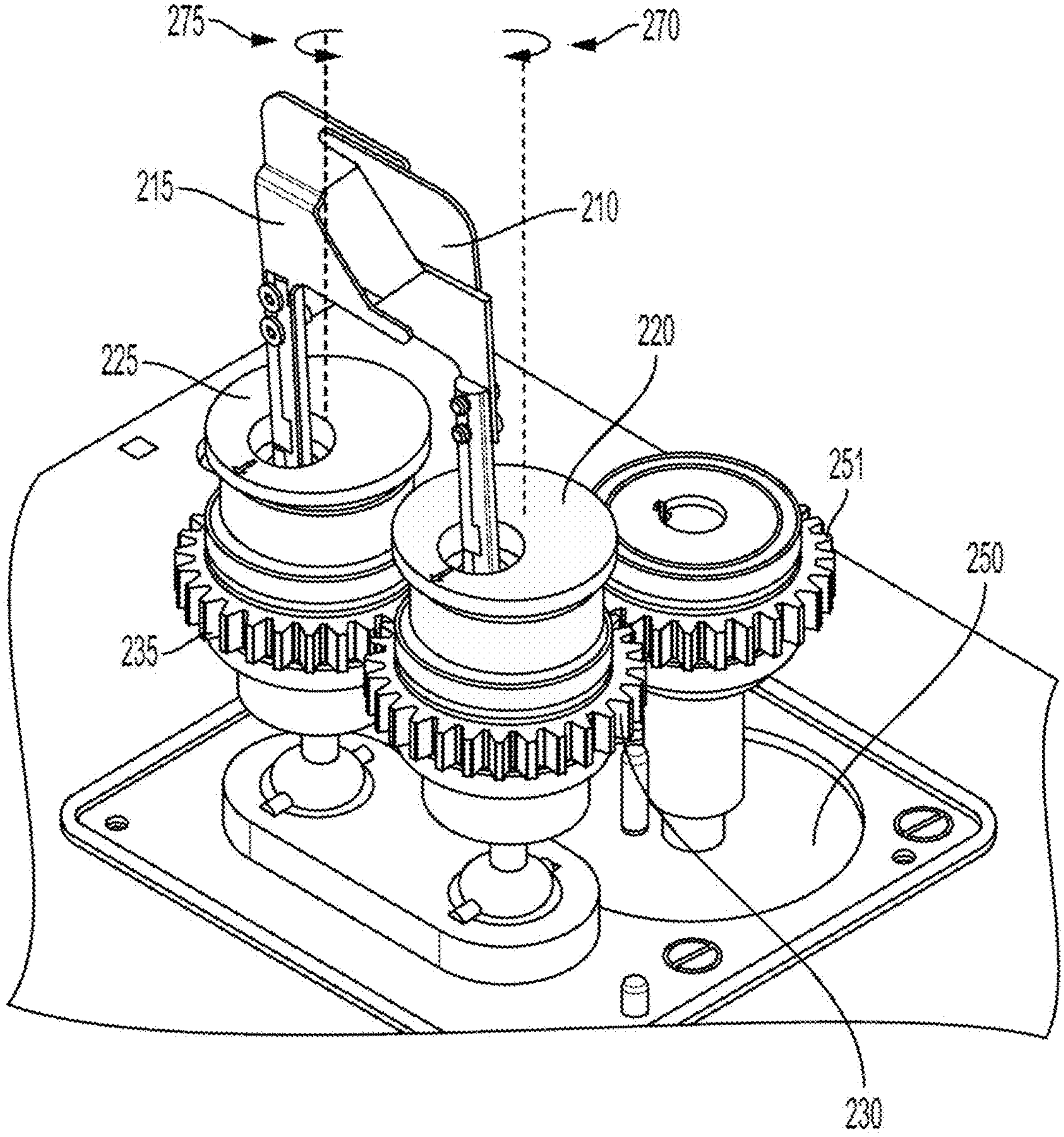
FIG. 2B is a perspective view of an embodiment of the invention showing two pincers in an intermediate position, in which the rotator plates are rotated approximately 90 degrees from the open position.
Figure 2C:
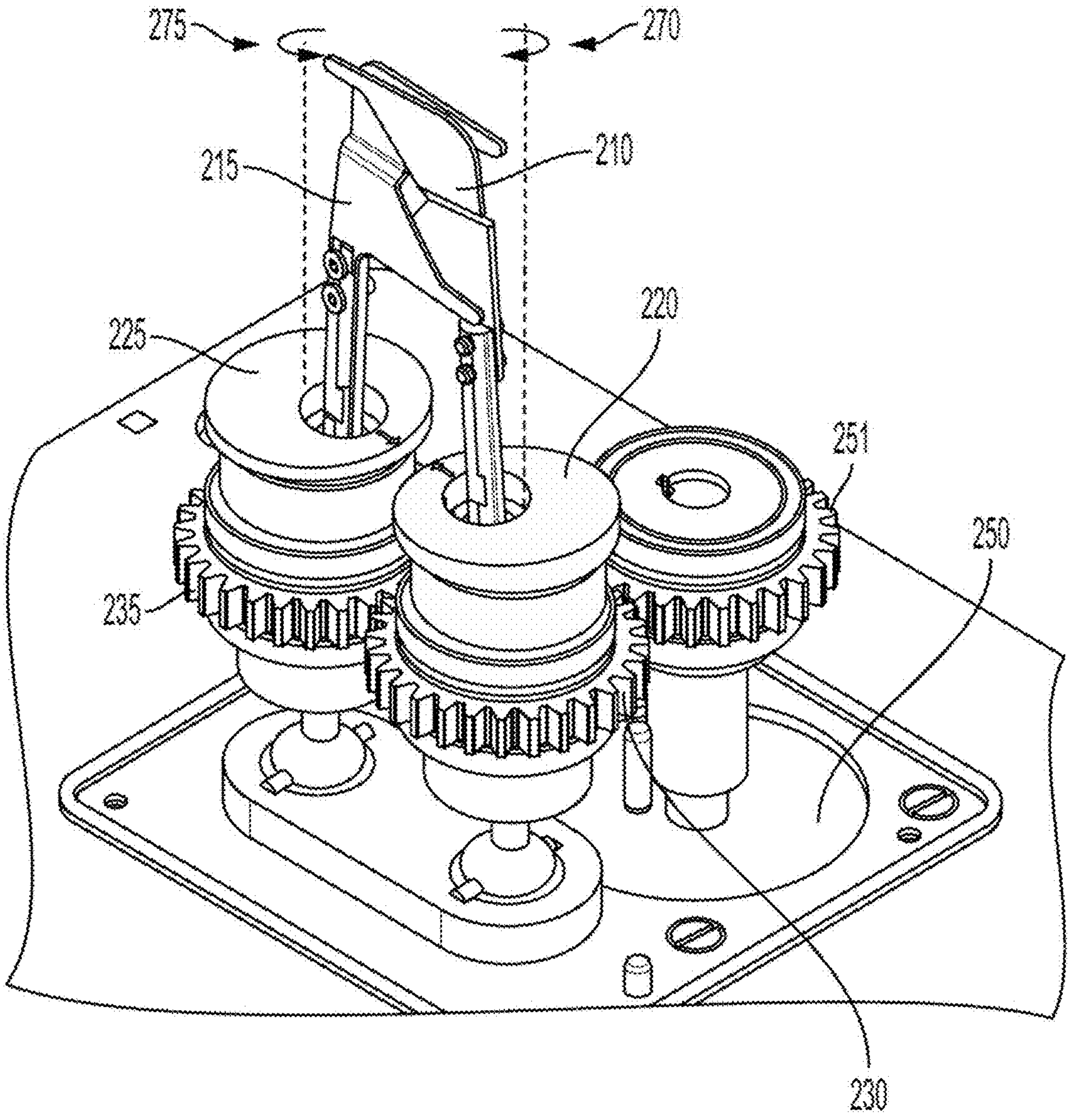
FIG. 2C is a perspective view of an embodiment of the invention showing two pincers interleaved in a closed position, in which the rotator plates are rotated approximately 180 degrees from the open position.
Figure 2D:
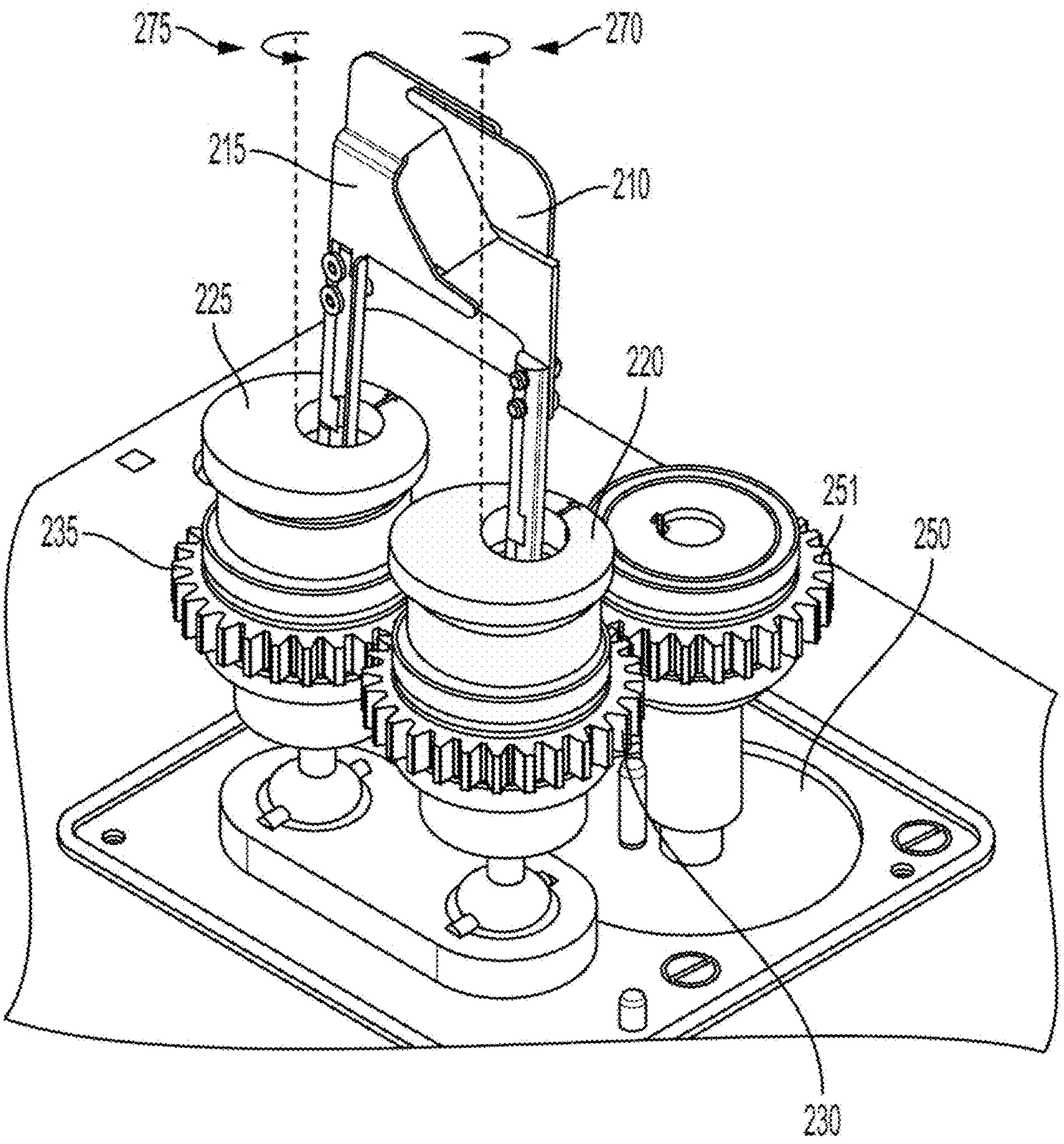
FIG. 2D is a perspective view of an embodiment of the invention showing two pincers in an intermediate position, in which the rotator plates are rotated about approximately 270 degrees from the open position.

FIG. 2A depicts a portioning device in an open position with the two pincers 210 and 215 farthest from each other. A sausage string (not shown) is fed between the two pincers 210 and 215. FIG. 2B depicts the rotator plate 220 rotated approximately 90 degrees clockwise about the axis 270, and the rotator plate 225 rotated approximately 90 degrees counter-clockwise about the axis 275, from the open position shown in FIG. 2A. FIG. 2C depicts the rotator plate 220 rotated approximately 180 degrees clockwise about the axis 270, and the rotator plate 225 rotated approximately 180 degrees counter-clockwise about the axis 275, from the open position shown in FIG. 2A. In FIG. 2C, where the two pincers 210 and 215 are interleaved in a closed position, the pincers apply pressure between the pinching edge of the pincers to the sausage string. The inward motion of the two pincers applies pressure between the pinching edge of the pincers to the sausage string, and a link is formed when the sausage string is twisted, at or right after the pincers 210 and 215 are released from the closed position. The twisting of the sausage string is typically performed by known equipment that feeds the sausage string to the portioning device and is not shown in these figures. FIG. 2D depicts the rotator plate 220 rotated approximately 270 degrees clockwise about the axis 270, and the rotator plate 225 rotated approximately 270 degrees counter-clockwise about the axis 275, from the open position shown in FIG. 2A.

Figure 2E:
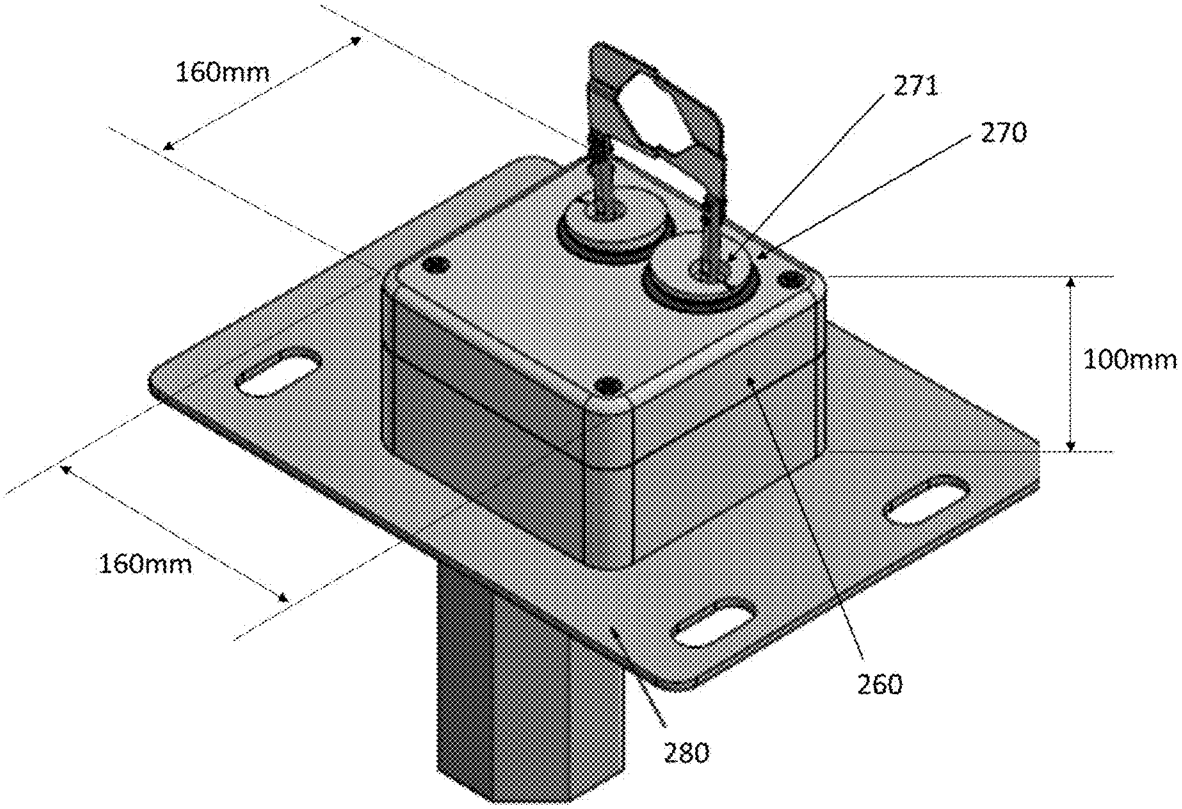
FIG. 2E is a perspective view of an embodiment of the invention, partly enclosed in a housing, showing two pincers in an open position.

All three gears 230, 235, and 251 can be housed in a compact enclosure, a housing 260. As a non-limiting example, FIG. 2E illustrates that the housing 260 can be approximately 160 mm×160 mm×100 mm. Enclosing the gears inside the housing 260 prevents sausage residues from falling onto the moving parts, interfering with the operation, and potentially damaging the device. Additionally, the housing 260 prevents liquids (e.g., cleaning solutions, sausage residues) from damaging the components inside. For example, the housing allows the components outside the housing to be easily washed while protecting the internal components. In some embodiments, a rotating seal 270 conceals the gap between the rotator plate and the housing, further preventing liquids from entering the housing while allowing the rotator plate to rotate. Similarly, in some embodiments, another rotating seal 271 conceals the gap between the rotator plate and the beam that protrudes from the rotator plate and connects to the pincer. This way, gears and bearings inside the housing are protected from rusting and can last longer, thereby reducing production costs and increasing overall efficiency.

Figure 3A:
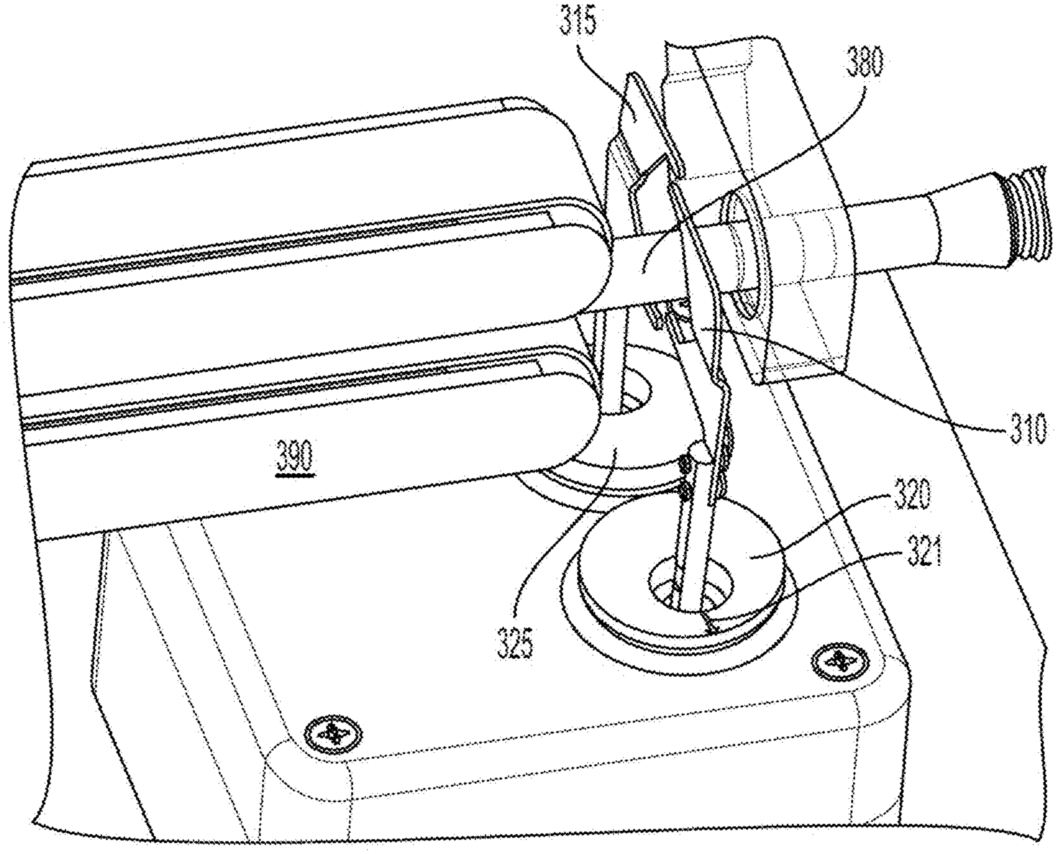
FIG. 3A is a perspective view of an embodiment of the invention showing two pincers in an open position, farthest from each other.

FIGS. 3A-3G illustrate pinching operation by an embodiment of a portioning device. For example, FIG. 3A depicts a portioning device with pincers 310 and 315 in an open position where the two pincers are farthest from each other, a sausage string 380 fed between the two pincers, and a takeaway belt 390 that carries the sausage string. A position mark 321 (shown as an arrow) on a rotator plate 320 can be used to help illustrate rotation of the rotator plates and pincers. FIGS. 3B-3G show the movement of rotator plates 320 and 325 and pincers 310 and 315, with each figure showing the rotator plates and pincers at certain positions. The following describes the rotator plate 320 and pincer 310 at each position; however, a person of ordinary skill in the art would appreciate that the rotator plate 325 and pincer 315 rotate in the opposite direction synchronously with the rotator plate 320 and pincer 310, consistent with the embodiments described above.

Figure 3B:
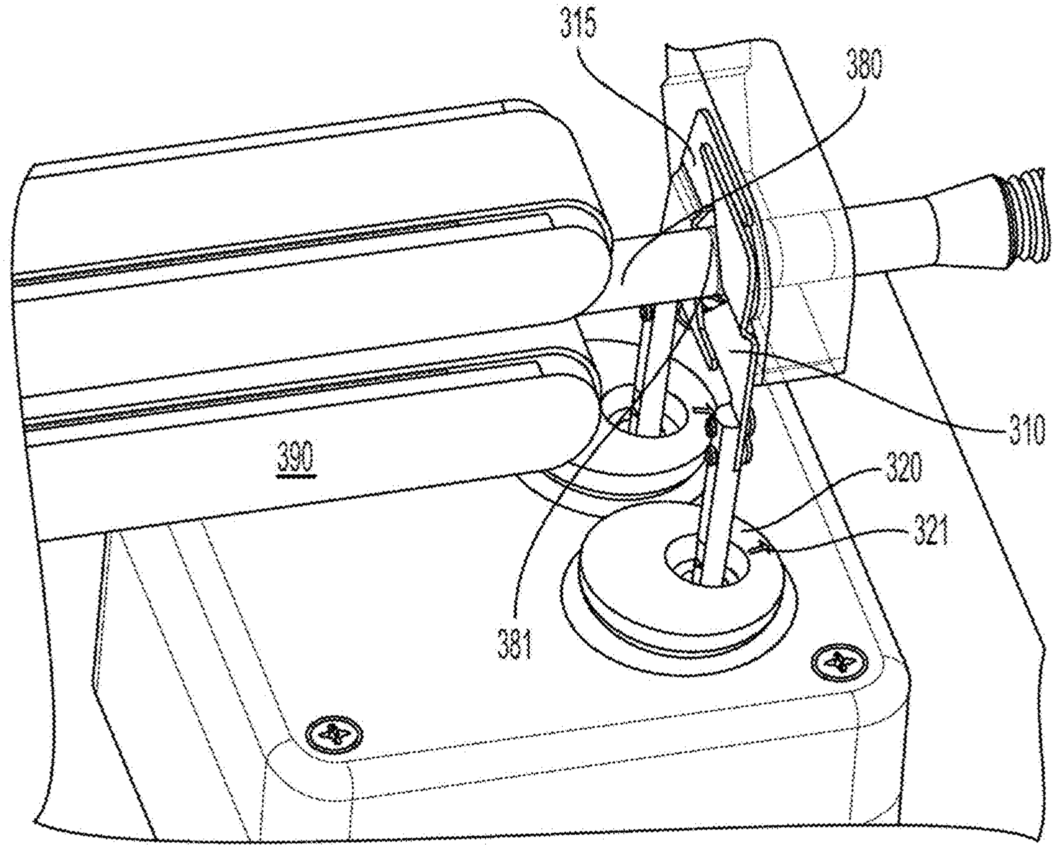
FIG. 3B is a perspective view of an embodiment of the invention showing two pincers in an intermediate position, in which the rotator plates are rotated approximately 90 degrees from the FIG. 3A position.
Figure 3C:
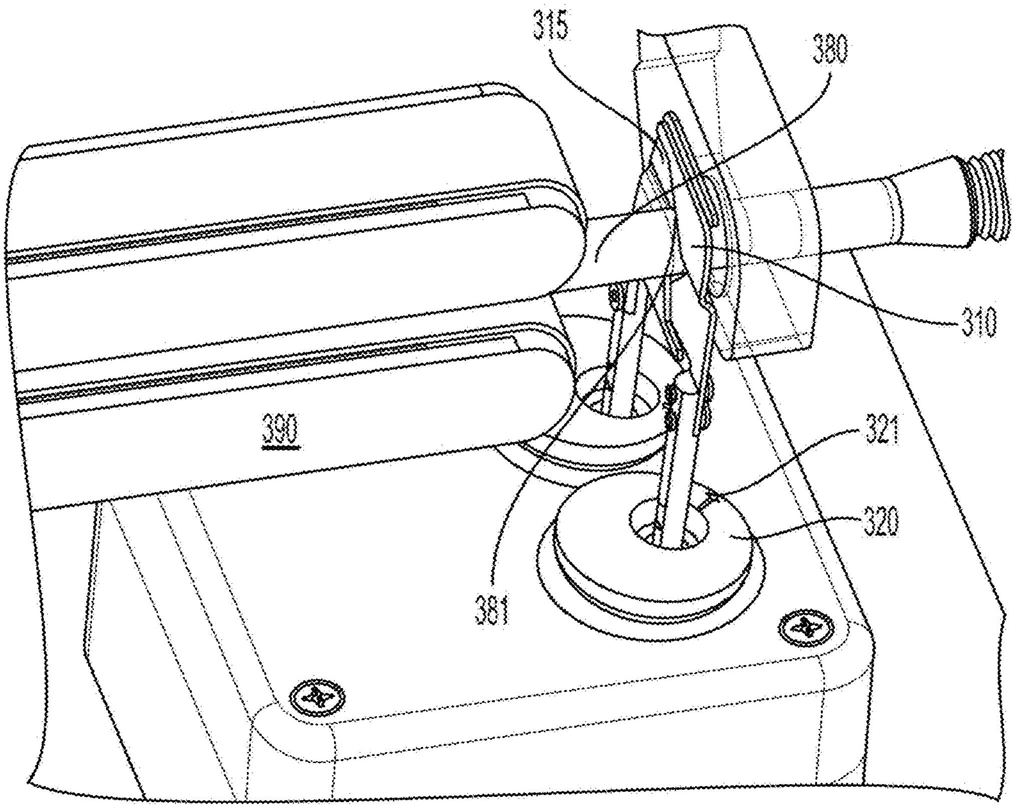
FIG. 3C is a perspective view of an embodiment of the invention showing two pincers in an intermediate position, in which the rotator plates are rotated approximately 30 degrees from the FIG. 3B position.
Figure 3D:
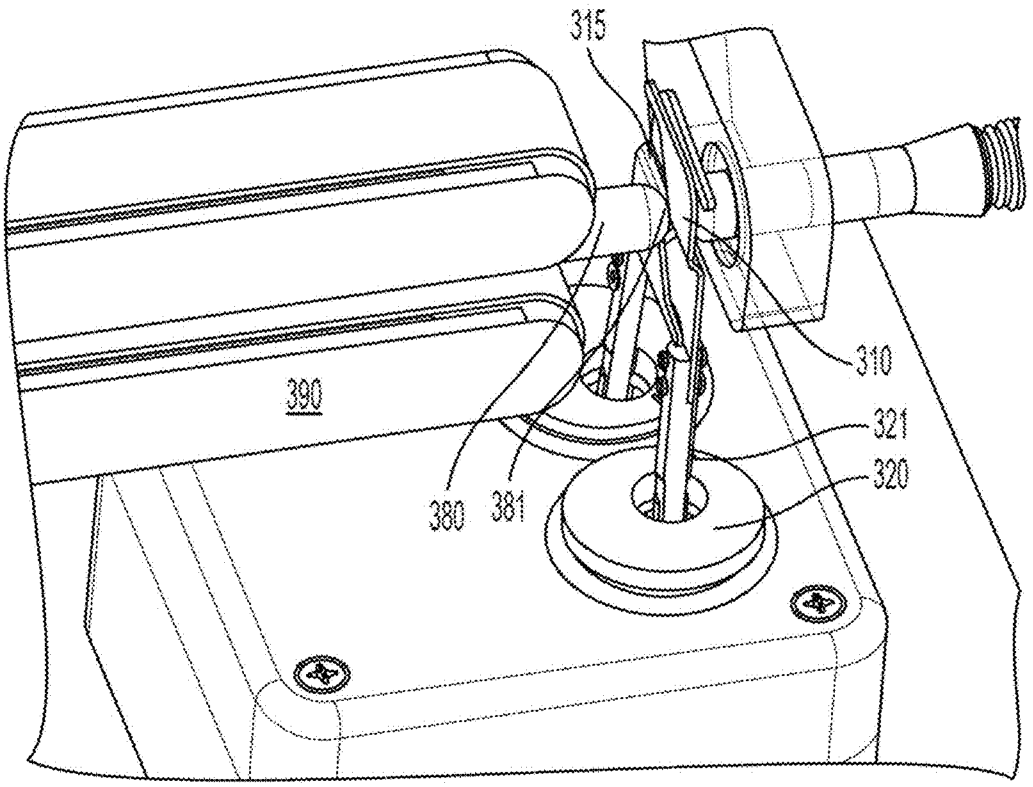
FIG. 3D is a perspective view of an embodiment of the invention showing two pincers in an intermediate position, in which the rotator plates are rotated approximately 30 degrees from the FIG. 3C position.
Figure 3E:
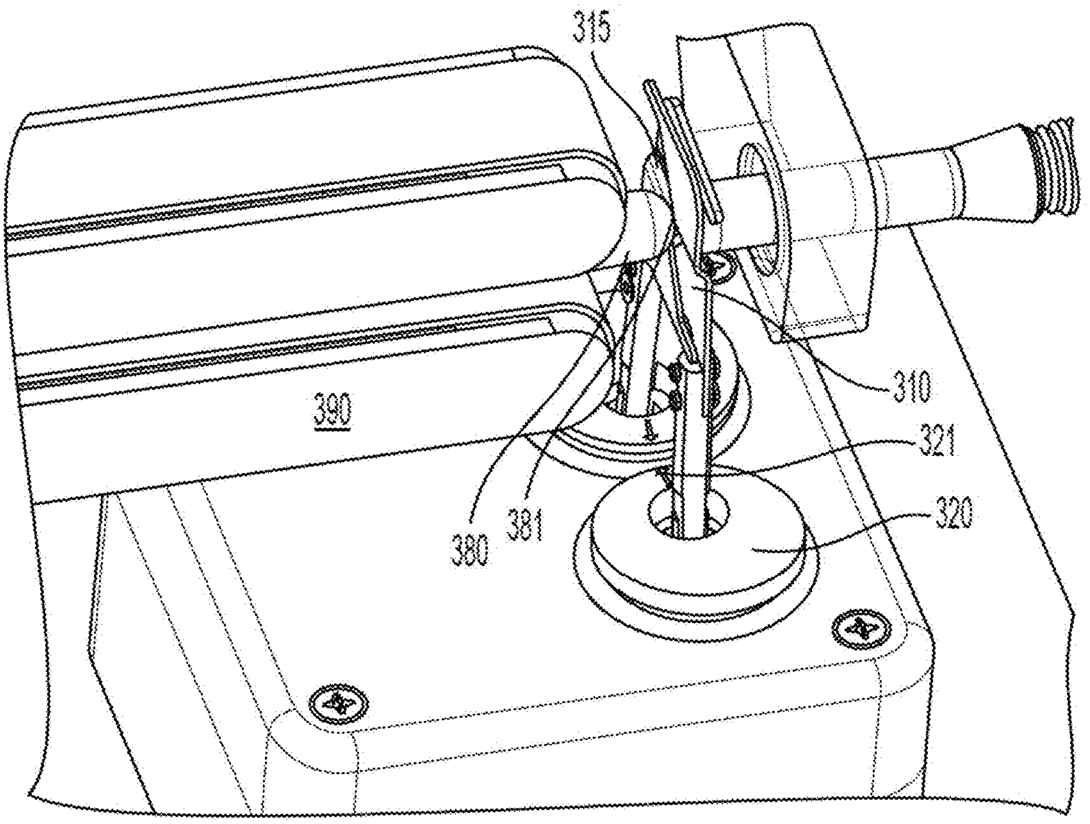
FIG. 3E is a perspective view of an embodiment of the invention showing two pincers in a closed position, in which the rotator plates are rotated approximately 30 degrees from the FIG. 3D position.
Figure 3F:
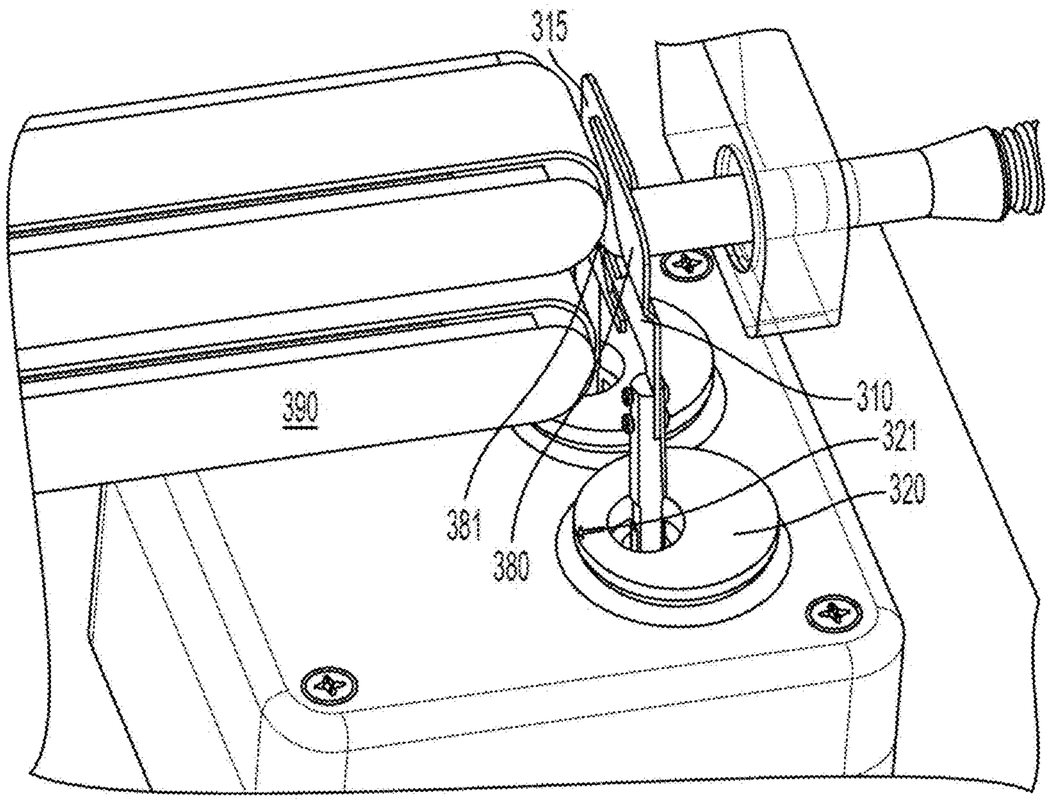
FIG. 3F is a perspective view of an embodiment of the invention showing two pincers in an intermediate position, in which the rotator plates are rotated approximately 90 degrees from the FIG. 3E position.
Figure 3G:
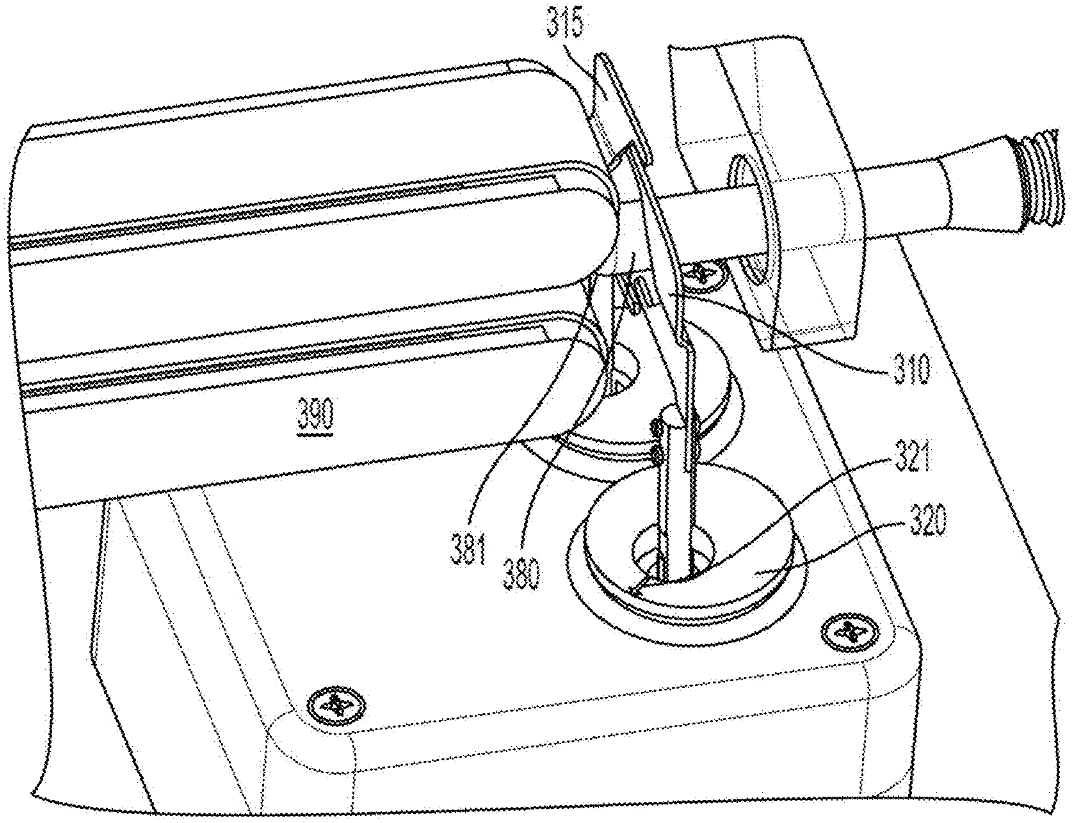
FIG. 3G is a perspective view of an embodiment of the invention showing two pincers in an intermediate position, in which the rotator plates are rotated approximately 45 degrees from the FIG. 3F position.

For example, FIG. 3B depicts the pincers starting to close in and interleaving. The position mark 321 illustrates that the rotator plate 320 and pincer 310 are rotated approximately 90 degrees clockwise from their position shown in FIG. 3A. At this moment, pincers are at the farthest from the takeaway belt 390 along the direction of travel of the sausage string 380. FIG. 3C depicts the rotator plate 320 and pincer 310 rotated approximately 30 degrees from FIG. 3B, making contact with the sausage string 380 at point 381 to begin applying pressure. The sausage string 380, and accordingly point 381, has moved towards the takeaway belt compared to FIG. 3B, due to the operation of the takeaway belt. FIG. 3D depicts the rotator plate 320 and pincer 310 rotated approximately 30 degrees from FIG. 3C, while the pincers continue applying pressure to point 381. FIG. 3E depicts the rotator plate 320 and pincer 310 rotated approximately 30 degrees from FIG. 3D, while the pincers are still applying pressure to point 381. FIG. 3F depicts the rotator plate 320 and pincer 310 rotated approximately 90 degrees from FIG. 3E (or approximately 180 degrees from FIG. 3B). The pincers have released the sausage string, and the link is formed at point 381. At this moment, point 381 and pincers 310 and 315 are closest to the takeaway belt 390. FIG. 3G depicts the rotator plate 320 and pincer 310 rotated approximately 45 degrees from FIG. 3F, on their way back to the position shown in FIG. 3A. The sausage string continues to be fed through the takeaway belt 390, through the opening between the pincers 310 and 315. The distance the sausage string travels while the pincers rotate (approximately 180 degrees) and come back to their positions of FIG. 3B, where the pincers start to make contact with the next point of the sausage string, becomes the length of one sausage link. Therefore, the rotational speed of the pincers synchronized with the speed of the takeaway belt and the amount of time the pincers remain stationary in the open position determine the length of the sausage link.

The disclosed operation allows the pincers to travel with the sausage string, continuously applying pressure. This minimizes "slipping," which could otherwise scratch the surface of the sausage casing and potentially cause rupture. In the disclosed embodiments, pressure can be applied to the sausage string more smoothly, rather than abruptly pinching at one instance, thus can minimize scratching of the sausage casing.

Also, the disclosed embodiments of angled pincers can shorten the distance the pincer panels travel along with the sausage string. Because the pincers close in at an angle, they can be spaced closer together and still apply the enough pressure to form links. This further contributes to the overall compactness of this invention. For example, FIGS. 4A and 4B show a top view and a side view of an embodiment of a portioning device.

Figure 4A:
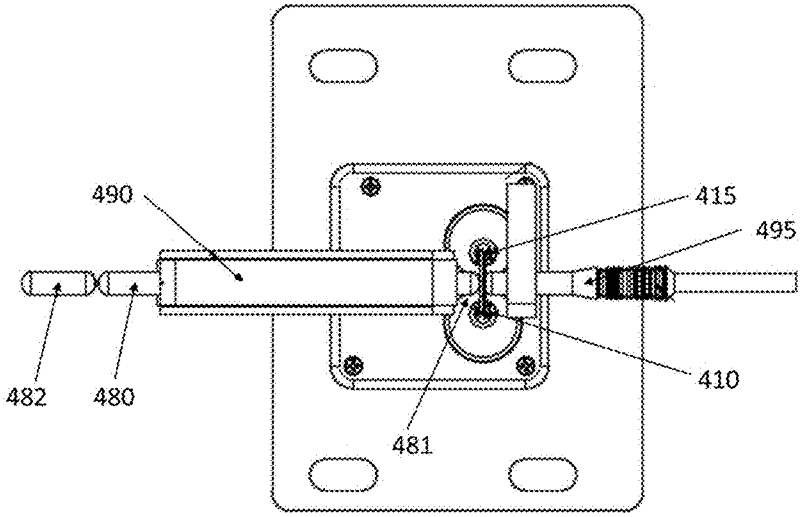
FIG. 4A is a top view of an embodiment of the invention showing two pincers in a closed position.
Figure 4B:
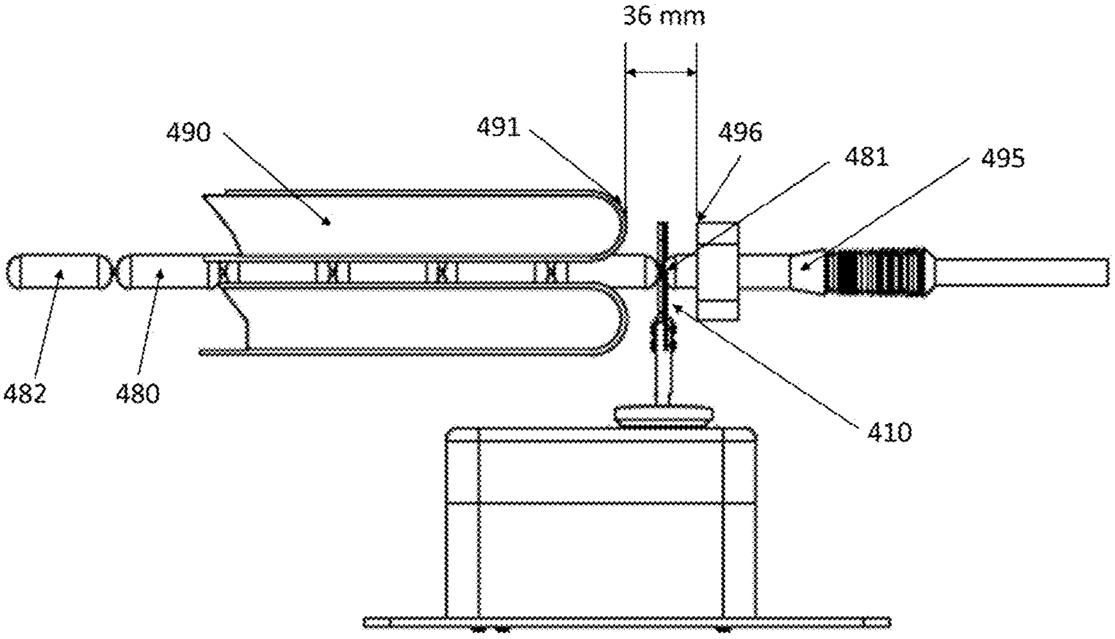
FIG. 4B is a side view of an embodiment of the invention showing two pincers in a closed position.

FIGS. 4A and 4B depict a portioning device with pincers 410 and 415 in a closed position, where a link is formed at point 481 of a sausage string 480, an apportioned sausage link 482, a takeaway belt 490, and a twisting horn 495. FIG. 4B further illustrates the distance between one end of the takeaway belt 491 and one end of the twisting horn 496. This distance, which is approximately the distance the pincers travel along the sausage string while applying pressure between the pinching edge of the pincers to form a link, can be determined based on many factors The factors include the thickness of the sausage string and casing, the pressure to form a link, the time to twist the string, the speed of the takeaway belt, the rotational speed of the pincers and rotating plates, and the angled opening of the pincers with respect to the traveling direction of the sausage string, among other things. As a non-limiting example, for a sausage string with 35 mm thickness and a 4-degree opening of the pincers, the distance may be 36 mm. As another non-limiting example, for thinner sausage strings, the pincers can be set up with a 2-degree opening, and the distance may be shortened to 20 mm. The angle of opening and the corresponding distance may be adjustable for different sausage strings and the pressure required to form a link. The less pressure required to form a link, the shorter the distance between the takeaway belt and twisting horn can be, allowing the portioning device to be more compact.

The angled orientation of pincers also provides a larger opening when the two pincers are in an open position. This allows for the portioning of a larger diameter (thicker) sausage string.

In some embodiments, the size of each apportioned sausage (sausage links) may be controlled by adjusting the amount of delay between when the driving gear executes a complete revolution. Relatively longer times between rotations causes a relatively longer sausage link. The speed of rotation of the driving gear is set so that the movement of the pincers in the direction of travel of the sausage string matches the speed of the sausage string. The speed of the motor 150 can be electronically controlled by software. This feature allows the invention to accommodate various sizes of sausage portions without the need for retooling.

Figure 5:
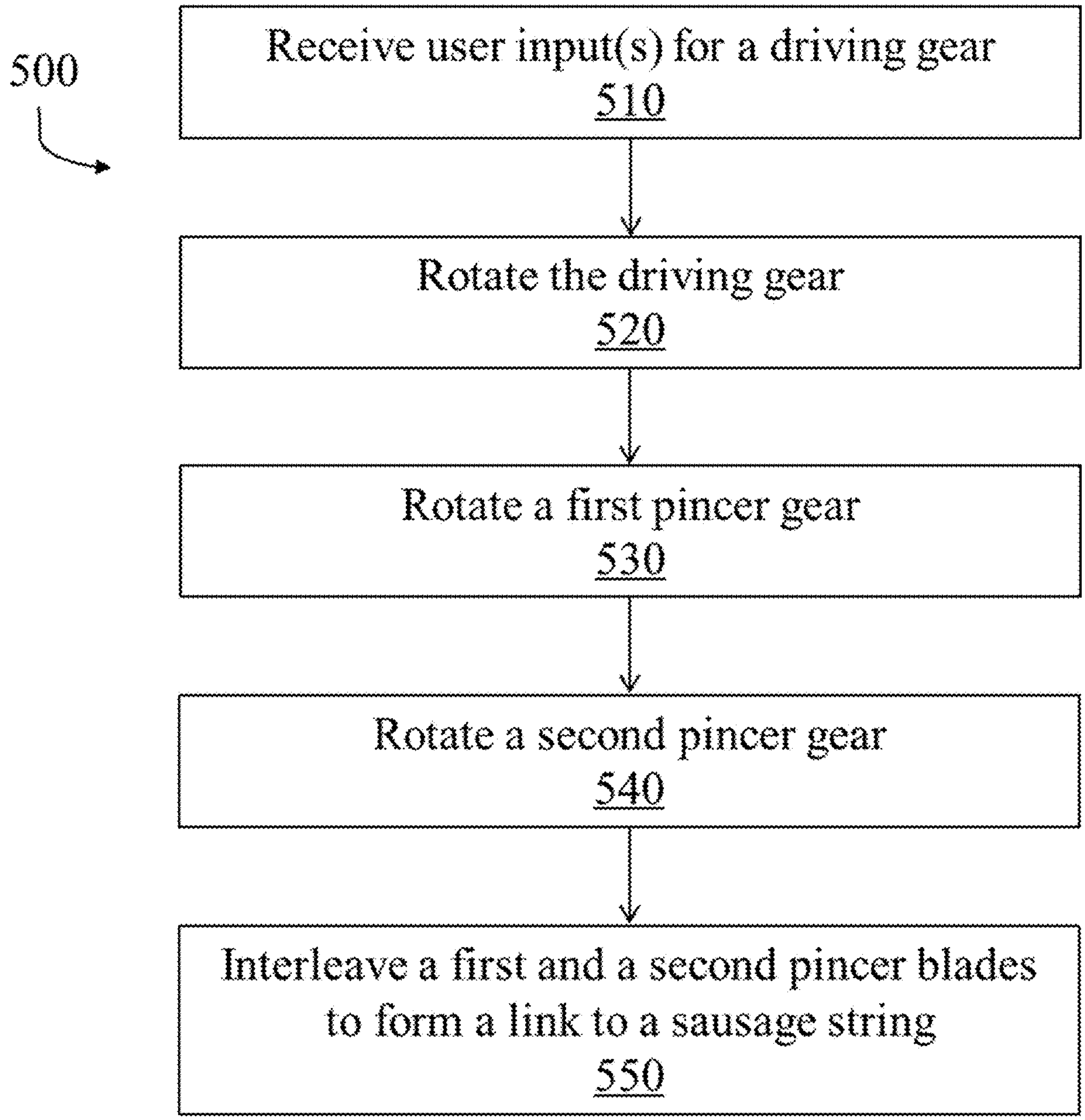
FIG. 5 is a logic flow diagram illustrating a method for high-speed portioning of sausage strings by forming links in a mass production environment using some of the embodiments introduced herein.

FIG. 5 is a logic flow diagram that illustrates a method for high-speed portioning of sausage strings by forming links in a mass production environment using some of the embodiments introduced herein. The steps shown in the figure are meant to illustrate the motion of components in the system and are not intended to limit the operation to a numerical order as shown in FIG. 5. For example, steps can be performed simultaneously. The method includes receiving one or more inputs from a user to set the rotational speed of the driving gear, e.g., to match the linear speed of the sausage string, and the delay between complete revolutions of the driving gear. The delay between rotations of the driving gear is one of the factors that decides the length of a sausage link. Another factor that decides the length, which can also be set from one or more user inputs, is the speed of the feeder that fills a sausage casing with stuffings, creating a sausage string, and feeds the string to the portioning device. The user inputs can be received and processed separately by the portioning device and the feeding device or can be received by a central system that controls both devices. Based on the received inputs, the rotational speed of the driving gear is set.

The driving gear then rotates an idler gear coupled with the driving gear, the idler gear rotates a first pincer gear coupled with the idler gear, and the first pincer gear rotates a second pincer gear coupled with the first pincer gear, as explained according so some embodiments herein. A first rotator plate and a second rotator plate attached to the first and second pincer gears, respectively, also rotate accordingly. A first pincer and a second pincer attached to the first and second rotator plates, respectively, also rotate accordingly. The rotation of the two pincers causes the pincer panels to be opened, interleaved, and closed. The sausage string is fed through the gap between the two pincer panels while they rotate. Once the pincers start closing in, the pincer panels begin to interleave and come into contact with the traveling sausage string. The panels travel along with the sausage string while closing in.

When the panels are fully interleaved, the casing of the sausage string is twisted, and a link is formed, portioning the sausage string. The pincers then start to rotate away from the interleaved position while the sausage string is fed again through the gap between the pincer panels. The entire process can be continuous or can be discrete with a stoppage in between cycles, e.g., at the closed position or at the open position. The length of the stoppage can be preset based on factors such as the rotational speed of the driving gear, speed of the takeaway belt, and/or target length of the sausage portion between links. The length of the stoppage can also be configurable based on one or more user inputs. A user can control the variables, such as by changing the rotational speed of the driving gear during the operation. This enables flexible control of the length of each sausage link without interrupting the process. Also, the user can pause the operation and change control variables.

The steps of a method or algorithm described in connection with the embodiments disclosed herein may be embodied directly in hardware, in a software module executed by a processor, or in a combination of the two. All of the processes described herein may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

The foregoing description of the present invention has been presented for purposes of illustration and description. Furthermore, the description is not intended to limit the invention to the form disclosed herein. Consequently, variations and modifications commensurate with the above teachings and the skill and knowledge of the relevant art are within the scope of the present invention. The embodiments described herein are further intended to explain best modes known for practicing the invention and enable others skilled in the art to utilize the invention in such or other embodiments and with various modifications required by the particular applications or uses of the present invention.

What is claimed is:

1. A portioning apparatus comprising:

a first beam coupled to a base and a second beam coupled to the base;

a first pincer gear coupled to the first beam and configured to rotate the first beam, a second pincer gear coupled to the second beam and configured to rotate the second beam, and the first pincer gear configured to rotate the second pincer gear;

a driver gear configured to rotate the first pincer gear;

a first pincer coupled to the first beam and defining a first pinching edge; and a second pincer coupled to the second beam and defining a second pinching edge, wherein:

the first beam and the first pincer are configured to rotate around a first axis of the first pincer gear, the first beam tracing a first conical shape about the first axis during rotation, the second beam and the second pincer are configured to rotate around a second axis of the second pincer gear synchronously with the first beam and the first pincer, the second beam tracing a second conical shape about the second axis during rotation, the first pincer and the second pincer are configured to interleave to apply pressure between the first pinching edge and the second pinching edge to form a portioning link, the first pinching edge of the first pincer and the second pinching edge of the second pincer are configured to face substantially towards each other as the first pincer and the second pincer rotate, and a third axis along a length of the first beam when the first pincer is farthest from the second pincer is at an angle relative to a fourth axis along the length of the first beam when the first pincer is closest to the second pincer.

2. The apparatus of claim 1, wherein the angle of the third axis along the length of the first beam when the first pincer is farthest from the second pincer relative to the fourth axis along the length of the first beam when the first pincer is closest to the second pincer is at least 2 degrees.

3. The apparatus of claim 1, wherein the angle of the third axis along the length of the first beam when the first pincer is farthest from the second pincer relative to the fourth axis along the length of the first beam when the first pincer is closest to the second pincer is at least 4 degrees.

4. The apparatus of claim 1, wherein the angle of the third axis along the length of the first beam when the first pincer is farthest from the second pincer relative to the fourth axis along the length of the first beam when the first pincer is closest to the second pincer is configurable.

5. The apparatus of claim 1, wherein a pinching side of the first pincer is substantially V-shaped.

6. The apparatus of claim 1, wherein a pinching side of the first pincer is substantially semi-circle shaped.

7. The apparatus of claim 1, wherein a pinching side of the first pincer includes a groove.

8. The apparatus of claim 1, wherein the first beam is coupled to the base through a ball-and-socket joint.

9. The apparatus of claim 1, wherein at least one idler gear is coupled between the driver gear and the first pincer gear.

10. The apparatus of claim 1, wherein a housing encloses the driver gear, the first pincer gear, and the second pincer gear.

11. The apparatus of claim 10, wherein a dimension of the housing is at most 160 millimeter by 160 millimeter by 100 millimeter.

12. The apparatus of claim 10, wherein a rotating seal conceals a gap between the first beam and the housing.

13. The apparatus of claim 1, wherein a rotational speed of the driver gear is configurable.

14. The apparatus of claim 1, wherein the driver gear is configured to pause between one rotation of the first beam and the first pincer.

15. The apparatus of claim 14, wherein the pause between rotation of the first beam and the first pincer is configurable.

16. A high-speed sausage link forming apparatus comprising:

a takeaway belt configured to carry a sausage string;

a driver gear configured to rotate a first pincer gear and a second pincer gear;

a first pincer coupled to a first beam and defining a first pinching edge; and a second pincer coupled to a second beam and defining a second pinching edge, wherein:

the first beam and the first pincer are configured to rotate around a first axis of the first pincer gear, the first beam tracing a first conical shape about the first axis during rotation, the second beam and the second pincer are configured to rotate around a second axis of the second pincer gear synchronously with the first beam and the first pincer, the second beam tracing a second conical shape about the second axis during rotation, the first pincer and the second pincer are configured to interleave to apply pressure between the first pinching edge and the second pinching edge to form a portioning link, the first pinching edge of the first pincer and the second pinching edge of the second pincer are configured to face substantially towards each other as the first pincer and the second pincer rotate, a third axis along a length of the first beam when the first pincer is farthest from the second pincer is at an angle relative to a fourth axis along the length of the first beam when the first pincer is closest to the second pincer, and the driver gear is configured to rotate in sync with the takeaway belt such that the sausage string travels along the takeaway belt while the first pincer gear and the second pincer gear rotate and the first pincer and the second pincer continuously apply pressure between the first pinching edge and the second pinching edge to form the portioning link as the first pincer and the second pincer travel with the sausage string for a predefined distance.

17. The apparatus of claim 16, wherein the angle of the third axis along the length of the first beam when the first pincer is farthest from the second pincer relative to the fourth axis along the length of the first beam when the first pincer is closest to the second pincer is configurable.

18. The apparatus of claim 16, wherein a rotational speed of the driver gear is configurable.

19. The apparatus of claim 16, wherein the driver gear is configured to pause between one rotation of the first beam and the first pincer.

20. The apparatus of claim 19, wherein the pause between rotation of the first beam and the first pincer is configurable.

* * * * *